Figure 1:
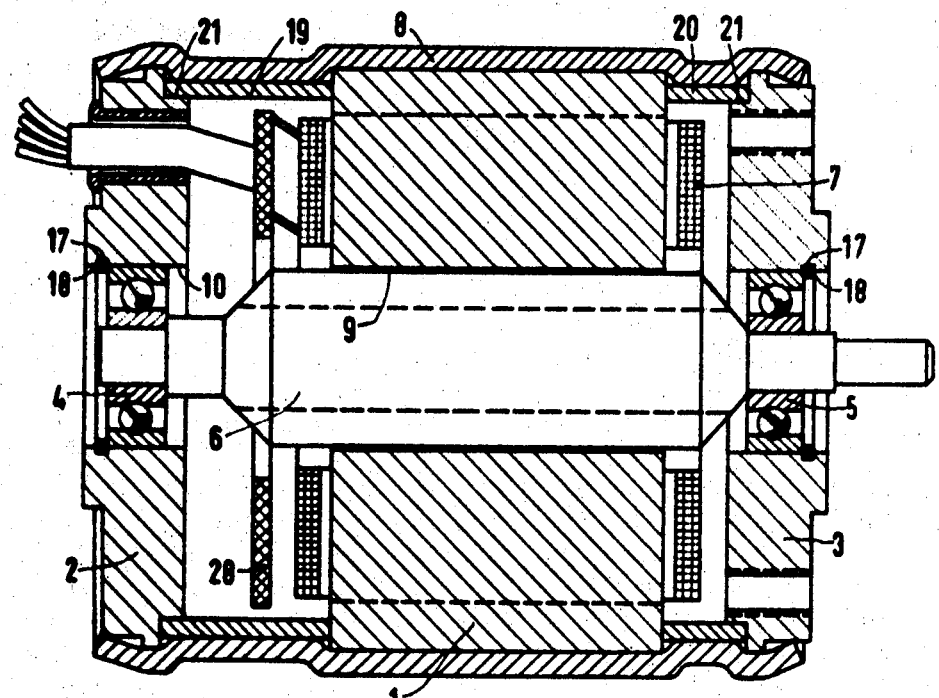

United States Patent

[11] 3,571,921

| [72] | Inventor | Wolfgang Pieper |
| | | Wurzburg, Germany |
| [21] | Appl. No. | 837,621 |
| [22] | Filed | June 30, 1969 |
| [45] | Patented | Mar. 23, 1971 |
| [73] | Assignee | Siemens Aktiengesellschaft |
| | | Berlin, Germany |
| [32] | Priority | July 3, 1968 |
| [33] | | Germany |
| [31] | | P 17 63 613.4 |

[54] METHOD OF MANUFACTURING AN ELECTRIC MOTOR BY HIGH-SPEED FORMING
3 Claims, 2 Drawing Figs.

[52] U.S. Cl. ............................................. 29/596,
29/421, 310/42, 310/89, 310/90
[51] Int. Cl. .................................................. H02k 15/00
[50] Field of Search .......................................... 29/596, 421
(M); 310/42, 89, 90

[56] References Cited
UNITED STATES PATENTS
| 3,310,691 | 3/1967 | Wilkinson .................. | 29/596X |
| 3,359,628 | 12/1967 | Rutledge et al. ............. | 29/596 |
| 3,413,715 | 12/1968 | Latussek et al. ............. | 29/596 |
| 3,431,625 | 3/1969 | Schenk et al. ................ | 29/596X |
| 3,439,403 | 4/1969 | Lippmann et al. ............ | 29/596X |

*Primary Examiner*—John F. Campbell
*Assistant Examiner*—Carl E. Hall
*Attorneys*—Curt M. Avery, Arthur E. Wilfond, Herbert L. Lerner and Daniel J. Tick ABSTRACT: A method of manufacture of an electric motor includes the steps of inserting a holding rod into the bore of a stator, the holding rod having the largest diameter which the bore can accommodate, positioning two bearing plates having respective bores of the same diameter as that of the stator on the rod adjacent the opposite ends of said stator, placing a housing around the stator and the bearing plates, pressing the housing against the stator and the bearing plates by a high speed forming process, removing the holding rod from the bores, and inserting a rotor supplied with a pair of bearings into said bores.

METHOD OF MANUFACTURING AN ELECTRIC MOTOR BY HIGH-SPEED FORMING

My invention relates to a method for manufacturing an electric motor. More particularly, the invention relates to a method of manufacture of an electric motor or generator by high speed forming.

The method includes holding the bearing plates of the motor in the position in which they are to be mounted by means of ancillary parts pressed against stator and bearing plates by a high-speed forming method, for example, by the magneform method. In the manufacture of midget motors, where it is essential to maintain a very small air gap between rotor and stator, it is known to connect the stator and the bearing plate by rolling up a sheathing tube. In such methods, the spaces between the bearing plate and the stator are cast with a casting mass to prevent damage to the winding from grinding chips, shavings and the like which accumulate during the subsequent grinding of the stator bore. In addition, the bores for the bearings in the bearing plates have to be appropriately processed in an assembled condition. This type of manufacture requires a relatively great number of operating steps, especially with regard to the casting and hardening of the cast mass. Also, the known method requires an internal-grinding machine which must work with great accuracy in long bores. For example, if the entire bore through the motor including the bore for the bearings is ground in one operational step, the cost is further increased. In this step, the grinding operation is hampered because materials of varying density must be bored in sequence.

It is also known to assemble a motor wherein the bearing plates are placed upon the rotor shaft by means of bearings, and are, after the rotor is centered, held by a suitable device in the position in which they are to be assembled into the motor. The bearing plates are then mounted into the motor with ancillary parts that are pressed against the stator and bearing plates by a high-speed forming process. The rotor is centered in the stator, with a suitable air gap therebetween, by a plurality of spacer needles or any suitable spacers. This assembly process is applicable to machines where the size of the air gap between stator and rotor does not have to meet stringent requirements. The method cannot be used, for example, in the manufacture of stepping motors, since numerous tolerances are superimposed upon one another the total of which is too high. For example, when air gap needles are employed, it is unavoidable that the tolerance of these needles is transferred when the rotor is centered in the stator. In addition, the tolerances associated with the already installed bearings can contribute unfavorably during the assembly process.

Typical of the method described in the last paragraph is that disclosed in the U.S. Pat. No. 3,432,700 of A. Diederichs for "Electric Motor and Method of Manufacture by High-Speed Deformation," dated Mar. 11, 1969 and assigned to the assignor of the instant application.

Accordingly it is an object of my invention to provide a method of manufacturing an electric motor which overcomes the above limitations of the known methods.

It is another object of my invention to provide a method of manufacturing an electric motor which enables precision motors to be assembled with a minimum number of steps. Subsidiary to this object, it is also an object of my invention to provide a method of manufacturing electrical motors which permits electric motors having the narrowest of airgaps between stator and rotor to be assembled in a simple manner at minimal cost and yet have satisfactory tolerances.

According to a feature of the invention the above objects are achieved in the production of motors having the narrowest airgaps by providing the bearing plates and the stators of the electrical machines with bores having the same diameter into which a cylindrical holding rod is inserted for the duration of the forming process, the rod having the largest diameter which the bores can accommodate. The rod is then removed and replaced by the rotor of the machine. The bearings of the rotor are positioned in the bearing plates and are adjusted to the bore. Because the stator and the bearing bores have the same diameter, the use of a holding rod having two or more portions of unequal diameter is unnecessary. The latter arrangement would introduce manufacturing tolerances which are of detrimental effect to the small airgap. The device used for mounting the electrical machinery can be constructed in simple fashion by inserting tubular spacers between the bearing plates and the stators. This makes it unnecessary to provide alternative means for maintaining an axial distance between the bearing plates.

According to another feature of the invention, tubular spacers or pipe segments are provided having a diameter so as to permit the same to function as a support for the housing means or jacket which surrounds the motor. This affords the advantages of protecting the motor windings and sealing the motor from ambient conditions. An annular groove is provided in the bores of the bearing plate for inserting guard rings for the bearings to prevent axial displacement of the rotor.

Figure 2:
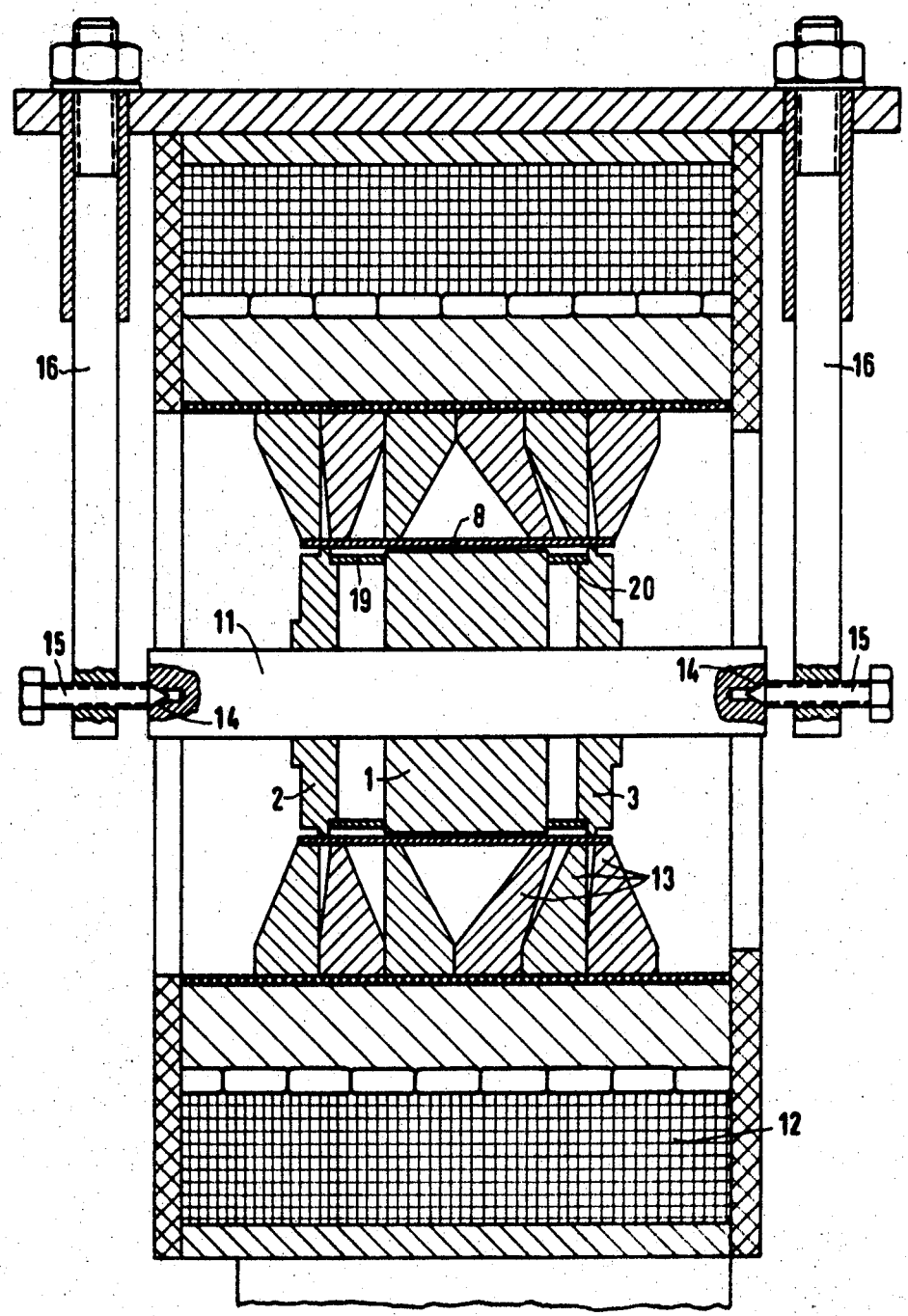

In order that the invention may be readily carried into effect, it will now be described with reference to the accompanying drawing, wherein:

FIG. 1 is an axial view, partly in section, of an embodiment of an electric motor produced by the method of manufacture of the invention; and, FIG. 2 is a schematic depiction, partly in section, of an electric motor being assembled by the method of the invention utilizing a high-speed magnetic forming apparatus.

Where the same parts appear in both drawings, they are denoted by the same reference numerals.

The electrical machine shown in FIG. 1 is a stepping motor and comprises a laminated stator 1, two bearing plates 2, 3 and a soft-iron rotor 6 rotatably mounted in ball bearings 4, 5. The laminated stator 1 has slotted stator laminations with the excitation windings 7 wound around the teeth formed by the slots. The coil terminals of the excitation windings are connected on a clutch plate 28 which also carries the connecting wires of the motor. The stator 1 is connected with the bearing plates 2, 3 by a housing means or enclosing tube 8, the latter being permanently joined to plates 2, 3 and stator 1 by pressure forming. The connection of plates 2, 3 to stator 1 must be established to ensure that the bore 9 in stator 1 and the bores 10 in the bearing plates 2 and 3 are aligned as well as possible. Referring to FIG. 2, this condition is achieved by providing the bores 9 and 10 with a removable holding rod which is inserted into the bores and which has an outer diameter machined to provide a snug fit in bores 9 and 10.

The motor is mounted for assembly by pushing the bearing plates 2, 3 on the holding rod 11 so that they enclose the previously mounted stator laminations 1. The housing means 8 is placed so as to surround the bearing plates 2, 3 and stator laminations 1. This is now placed into the apparatus for high-speed forming which comprises, for example, a compression coil 12 and field concentrator 13. In order to support the motor within the field concentrator 12, it is preferable to provide the holding rod 11 with centering bores 14 which are engaged by screws 15 attached to a centering device 16. Following the forming of the housing means 8 by the application of high pressure to selected portions thereof when the compression coil 12 is energized, the holding rod 11 is pulled from the bearing plates 2, 3 and from the stator 1. Then the rotor 6 with ball bearings 4, 5, is inserted into the respective bores 9, 10. Annular grooves 17 provided in the bearing plates 2, 3 function to receive guard rings 18 which secure the rotor 6 against axial displacement in the bearing shields 2 and 3.

According to another feature of the invention, tubular spacers or pipe segments 19, 20 are placed between stator 1 and bearing shields 2, 3 which, as shown in FIG. 1, function to support and seat the formed portions of the housing means or enclosure tube 8. A groove 21 in the bearing plates 2, 3 is concentric with the bore 10 and functions to center the tubular spacers 19, 20. The forming process causes the tubular spacers 19, 20 to be pressed against the stator 1 which seals the machine, in substantial measure, against the ambient. The tubular spacers 19, 20 are preferably made of synthetic material so that the coil 7 does not become damaged by the formed portions of the housing means 8.

The invention affords a method of manufacturing a motor having a relatively narrow airgap, for example, 50 micromillimeter and less. The invention permits a motor to be produced simply and with tight tolerances.

To those skilled in the art it will be obvious upon a study of this disclosure that my invention permits of various modifications and may be given embodiments other than particularly illustrated herein, without departing from the essential features of the invention and within the scope of the claims annexed hereto.

I claim:

1. A method of manufacture of an electric motor having a stator with a bore, two bearing plates with respective bores of the same diameter as that of said stator bore, housing means surrounding said stator and plates, and a rotor disposed coaxially with said stator, said rotor being equipped with a pair of bearings, said method comprising the steps of inserting into said bore of said stator a holding rod having the largest diameter which said stator bore can accommodate, positioning said bearing plates on said rod adjacent opposite ends of said stator, positioning respective tubular spacers having a diameter of sufficient magnitude to permit said spacers to support said housing means after said housing means is pressed by a forming process intermediate each of said bearing plates and said stator, placing said housing means around said stator and said bearing plates, pressing said housing means against said stator, said bearing plates and said spacers by a high-speed forming process, removing said holding rod from said bores, and inserting said rotor into said bores.

2. A method of manufacture of an electric motor according to claim 1, wherein said bearing plates have respective annular grooves concentric with said respective bores, and wherein said method includes, after the step of inserting said rotor, the step of inserting two securing rings in said annular grooves respectively.

3. In a method according to claim 1, wherein said high speed forming process is a magneform process.